United States Patent Office 3,314,805
Patented Apr. 18, 1967

3,314,805
MANUFACTURE OF DEHYDRATED POTATOES
Robert A. S. Templeton, Cereal House, 58 Mark Lane, London, England
No Drawing. Filed Apr. 4, 1963, Ser. No. 270,529
Claims priority, application Great Britain, Apr. 6, 1962, 13,433/62; June 14, 1962, 22,994/62
6 Claims. (Cl. 99—207)

The present invention relates to the production of a dehydrated potato product in the form of flakes or granules.

The production of potato flakes from cooked mashed potatoes is described in British Patents Nos. 767,903, 773,361, 791,193 and 884,267. In British Patent No. 791,193 it has been shown that a precooking treatment in which the potatoes are precooked at a temperature of 140–180° F. and for a time preferably falling within the range of 10–60 minutes improves the texture of the ultimate product and a further improvement is described in British Patent No. 884,267, in which, after the precooking treatment, the potatoes are cooled by water before the final cooking step is commenced.

In the production of a dehydrated potato product following the process described in these patents, practical difficulties arise in consequence of the number of desirable or necessary steps which have to be applied to the potatoes, thus washing, peeling, precooking, cooling, final cooking, mashing and drying.

It is known that the step of peeling can be accomplished in a number of ways, for example, removing the skin by an abrasive action or by immersion in a strong alkali solution, which has the effect of softening the skin, thus permitting its easier removal with less subsequent abrasive action.

In the well-known method of skin removal by immersion in alkali solution the potatoes are immersed in a heated caustic soda solution of about 20% strength and the immersion time is about three minutes at about 180° C.

It has now been found that in carrying out the process of manufacturing dehydrated potatoes according to the above numbered patents, it is possible to reduce the number of steps and at the same time to produce an end product having qualitative advantages and economic advantages with regard to the operating cost of the process by combining the precooking treatment with an application of alkali, thereby facilitating the removal of the skins, after the precooking treatment.

According to the present invention there is provided a process for the production of a dehydrated mashed potato product in which the potatoes to be dehydrated are precooked for 10–60 minutes in an unpeeled condition in a dilute alkali solution having a strength of less than 5%, the potatoes thereafter being peeled before final cooking. The strength of the alkali solution will be determined by the time selected for the precooking treatment, the longer the precooking treatment, the less strength is required for the alkali solution. The strength of the alkali is adjusted to give adequate skin softening in the time necessary to complete the precooking treatment.

Where it is necessary to continue the precooking treatment for a period of about 40 minutes at a temperature within the range of 140–180° F., it suffices to use a caustic soda solution of about 1% strength. However, where adequate precooking can be achieved within about 20 minutes, it is necessary to employ a caustic soda solution of about 3% strength to achieve adequate skin softening within the time available.

The skin softening treatment is thus carried out under very different conditions than is customary in the known method of skin removal by the use of alkali referred to above. It is found that the treatment of potatoes for a much extended period, as compared with prior practice, in relatively dilute alkali under the conditions above indicated does not lead to the discoloration and the production of off-flavour to any noticeable extent, contrary to ordinary expectation, and furthermore, it is found that the extended treatment in dilute alkali leads to greater penetration of the alkali solution into cracks and splits in the potatoes, with the result that these are more thoroughly cleansed.

By this method the precooking and the gelatinisation of the starch is satisfactorily achieved whilst simultaneously the potato skin is prepared for easy removal immediately following the completion of this heat treatment. The skins may be removed by the use of strong water sprays acting on the surfaces and skins of the potatoes, preferably in conjunction with a tumbling action producing sufficient abrasion at the surfaces to break the softened skins for removal by the water sprays. The peeling of the potatoes may thus be accompanied by removal of heat therefrom, which is desirable, as has been shown in British Patent No. 884,267.

Thus, by removing the skin, not at the commencement of the operation as heretofore recommended nor at the end of the operation after drying as has already been suggested, but in the middle of the operation after precooking but before final cooking distinct qualitative and economic advantage is attained.

There is a further economic and qualitative advantage arising from the process of the present invention, in that when the skins are removed prior to the precooking treatment in water, some leeching of the solids of the potato takes place, and such leeched out solids become a loss of potential end product and add to the difficulty of the treatment by requiring frequent changes of water to remove them. The protective effect of the skins during the precooking treatment significantly reduces these losses.

Where it is desired to cool the potatoes down between the precooking and final cooking, as described in British Patent No. 884,267, there is some slight advantage in deferring the removal of the skins of the potatoes until the end of the cooling step, or as a conclusion of that step before entry to the final cooking, but this is not essential; almost equal advantage is obtained when the skins are removed by water sprays and/or abrasion at the commencement of the cooling step, or if cooling is not practised before the final cooking.

By using the present process for the softening of the skins at the same time as a precooking treatment is effected it is possible to reduce the loss of potato weight by peeling from as much as 30% weight of the potatoes in the case of abrasive peeling to as little as 7½% of the initial weight, so that the cost gain is self-evident. The qualitative gain is caused by the particularly effective and complete removal of the skin and eyes due to the prolonged treatment in the abnormally dilute lye and to the fact that solids are not leeched out during the precooking treatment.

Preferably the potatoes, after precooking in the dilute alkali solution, are immersed in or sprayed with a dilute solution of a weak acid, such as a 1% aqueous solution of citric acid to neutralise alkali on the skins of the potatoes.

After cooking, the thus prepared potatoes may be dehydrated to the form of potato flake by the process of British Patent No. 767,903 or like process or may be converted to dehydrated potato granules or other cooked potato products, such as discs or shreds, by standard techniques.

Other fruits and tubers from which it is desired to remove skins prior to any form of further processing could of course be similarly treated.

Example

Unpeeled potatoes were treated for 20 minutes in a 3% aqueous caustic soda solution at 180° F. to effect a combined skin softening and precooking treatment.

At the end of the treatment in caustic soda solution, the potatoes are gently tumbled in a rotating reel having a slightly abrasive surface so as to effect some breaking of the potato skins and at the same time they are subjected to strong water jets, which wash away the skins, which have been softened and loosened by the treatment with caustic soda. The water jets, as well as effecting the skin removal, also cool the potatoes, which is known to be advantageous before the final cooking of the potatoes takes place.

In order to produce a dehydrated cooked mashed potato product of good quality, it is necessary to keep the proportion of cells, which are ruptured in the dehydration process, down to about 7%.

By following the described process of precooking unpeeled potatoes in hot dilute caustic soda lye, followed by peeling by means of cold water sprays and then cooking the cooled potatoes by immersing them in water maintained at a temperature just below boiling point, 205–210° F. for example, the proportion of cell breakage may be kept to a value of 4 to 5%.

However, this rate of cell rupture may be even further reduced by heating the cooled potatoes slowly to the cooking temperature in water, which is initially cool. It has been found that if the potatoes are gradually heated to the cooking temperature in water, the temperature of which has only a moderate excess, not more than, say, fifty-five degrees Fahrenheit or thirty degrees centigrade, over the temperature in the cells in the surface layers of the potatoes, the proportion of cells ruptured during cooking is significantly reduced. For example, the potatoes may be placed in water at an initial temperature of about 95–105° F. (35–40° C.), the temperature of the water then being raised to the cooking temperature at a rate of, for example, about 5° F. per minute. A significant reduction in the proportion of ruptured cells is achieved in this way, to the extent that the process step of positive cooling between the precook and final cooking stages may be dispensed with.

It is also found to be very advantageous to utilise the same technique in the precooking stage, so that the precooking stage is carried out by placing the unpeeled potatoes initially in cool dilute caustic soda solution, which is then gradually raised to the precooking temperature. After completion of the precooking stage in dilute alkali the potatoes may be transferred to a final cooking vessel in which they are cooked in water or by steam at atmospheric pressure, so that the temperature at the surface of the potatoes would be slightly below 212° F. The peeling stage in such case could be effected by means of warm or hot water jets applied immediately after the precooking stage so as to avoid undue cooling of the potatoes. Alternatively, in some circumstances, the removal of the potato skins could be effected after completion of the cooking of the potatoes.

I claim:
1. In a process for the production of a dehydrated mashed potato product, the improvement comprising in that the potatoes are initially precooked in an unpeeled condition for 10–60 minutes in a dilute alkali solution having a strength of less than 5% to effect simultaneous precooking of the potato flesh and softening of the potato skin to ease its subsequent removal.

2. A process for the production of a dehydrated mashed potato product according to claim 1, further characterised in that the unpeeled potatoes are precooked in a 1–3% caustic soda solution at a temperature of 140–180° F. for 20–40 minutes.

3. A process for the production of a dehydrated mashed potato product according to claim 2, further characterised in that, after their initial precooking and skin-softening treatment, the skins of the potatoes are removed with simultaneous cooling of the potatoes.

4. A process for the production of a dehydrated mashed potato product according to claim 3, further characterised in that the skin removal of the potatoes is effected by the application of strong sprays of water accompanied by simultaneous agitation to commence the breaking up of the alkali-softened potato skins.

5. A process for the production of a dehydrated mashed potato product according to claim 4, wherein the cooking of the cooled peeled potatoes is completed by immersion in water at a temperature slightly below boiling point.

6. A process for the production of a dehydrated mashed potato product, according to claim 4, wherein the heating of the potatoes for precooking and final cooking is obtained by immersing them in liquid at a temperature not more than fifty-five degrees F. above the surface temperature of the cooled potatoes and heating them slowly to boiling point.

References Cited by the Examiner

FOREIGN PATENTS 791,193  2/1958  Great Britain.
884,267  12/1961  Great Britain.

A. LOUIS MONACELL, *Primary Examiner.*

R. S. AULL, D. M. NAFF, *Assistant Examiners.*